United States Patent [19]

Garringer

[11] Patent Number: 4,706,367
[45] Date of Patent: Nov. 17, 1987

[54] SYSTEM AND METHOD FOR MECHANICALLY JOINING HANDRAILING MEMBERS

[75] Inventor: Lester G. Garringer, Lakeland, Fla.

[73] Assignee: Specialty Maintenance and Construction, Inc., Lakeland, Fla.

[21] Appl. No.: 809,205

[22] Filed: Dec. 16, 1985

[51] Int. Cl.[4] .......................... B23P 11/02; F16B 7/10
[52] U.S. Cl. .................... 29/526 R; 29/453; 403/109; 403/365
[58] Field of Search ...................... 29/157 R, 446, 453, 29/525, 526 R; 403/109, 365, 375, 377; 339/74 R, 253

[56] References Cited

U.S. PATENT DOCUMENTS

| | | | |
|---|---|---|---|
| 1,988,595 | 1/1935 | Hiss | 29/453 |
| 2,890,072 | 6/1959 | Kaman et al. | 403/365 |
| 3,122,383 | 2/1964 | Hirsch | 403/292 |
| 3,336,004 | 8/1967 | Edie et al. | 403/264 |
| 3,413,021 | 11/1968 | Potts | 29/453 |
| 3,515,418 | 6/1970 | Nelsen, Jr. | 403/109 |
| 3,544,140 | 12/1970 | Langheck | 403/189 |
| 3,717,047 | 2/1973 | Hill | 29/453 |
| 4,050,722 | 9/1977 | Berger et al. | 29/453 |
| 4,063,836 | 12/1977 | Militano | 403/322 |
| 4,140,298 | 2/1979 | Coleman, Jr. | 403/252 |
| 4,247,147 | 1/1981 | Rettkowski | 403/326 |
| 4,361,314 | 11/1982 | Ohlson | 403/230 |
| 4,405,251 | 9/1983 | Kolchinsky et al. | 403/377 |
| 4,419,026 | 12/1983 | Leto | 403/109 |

Primary Examiner—Howard N. Goldberg
Assistant Examiner—Irene Graves Golabi
Attorney, Agent, or Firm—Duckworth, Allen, Dyer

[57] ABSTRACT

A mechanical joint for interconnecting rail members having a male end on one of the rail members, a female end on the other rail member, and an annular collar for constraining longitudinal movement. The male member has an external circumferential groove for receiving the annular collar. The female end has an internal circumferential groove which aligns with both the annular collar and the external circumferential groove on the male end.

13 Claims, 15 Drawing Figures

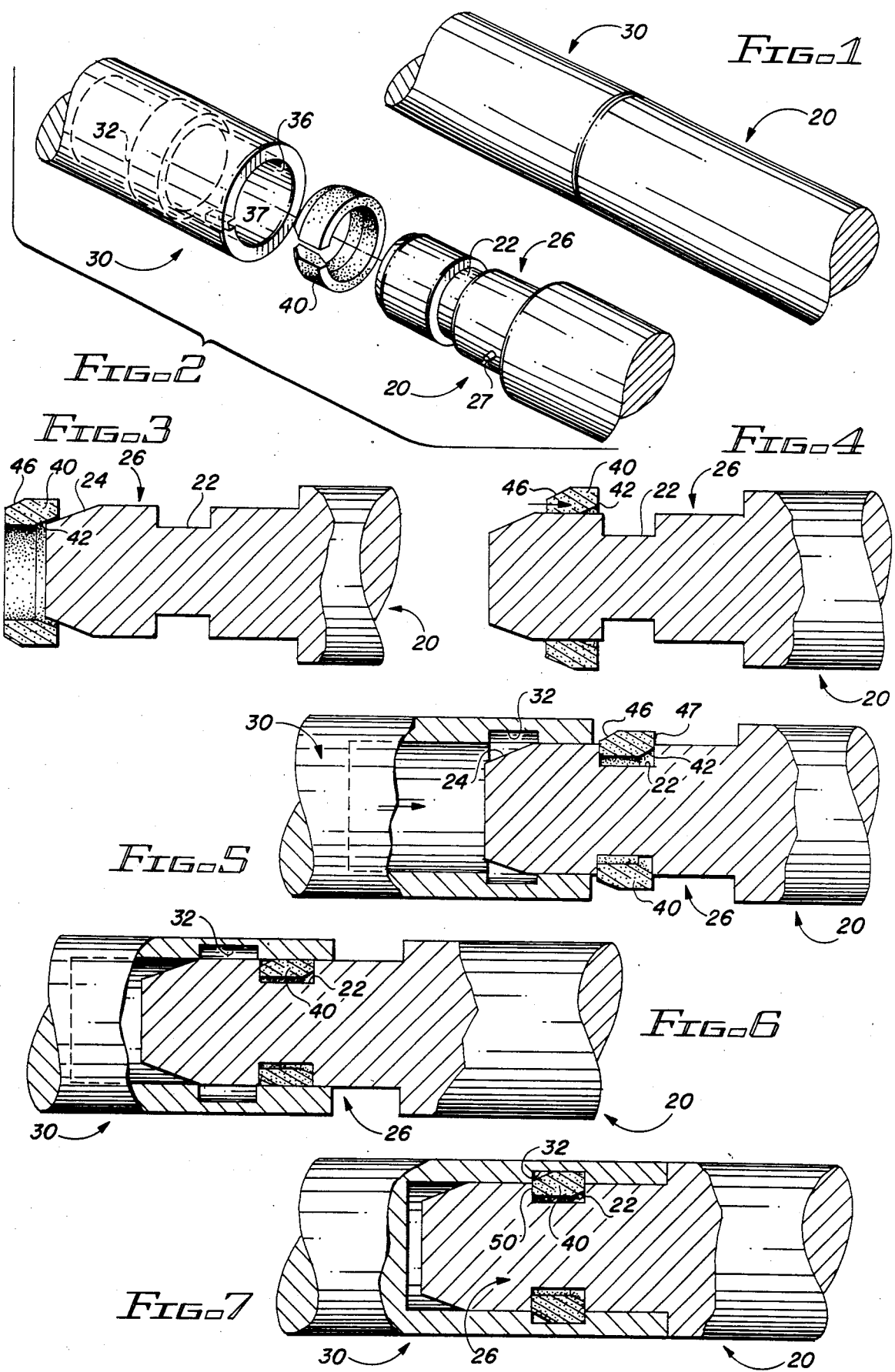

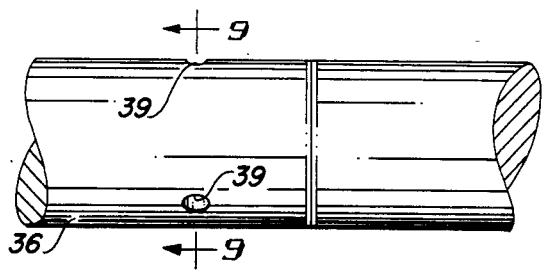
FIG. 8
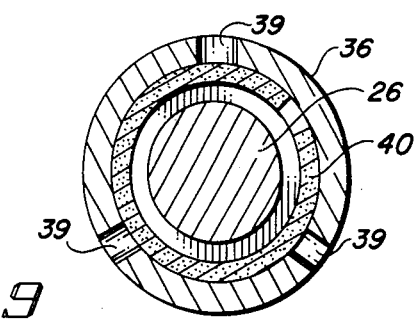
FIG. 9
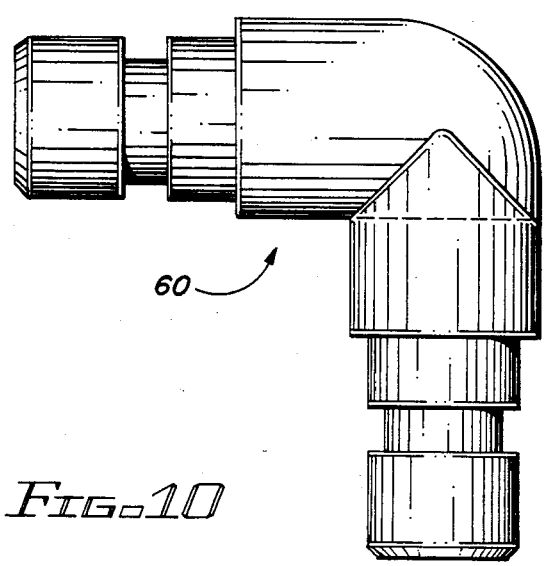
FIG. 10
FIG. 11
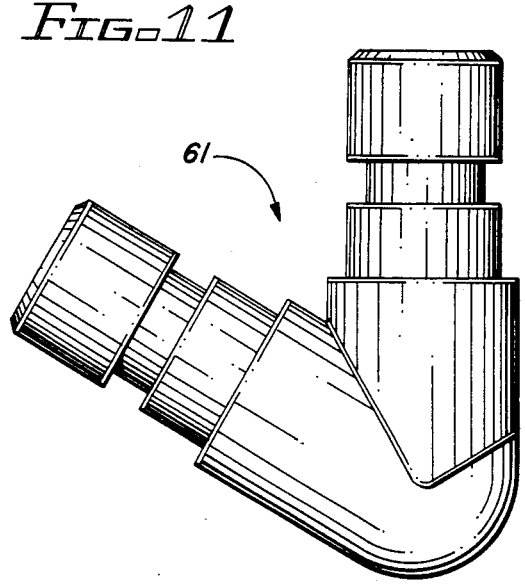
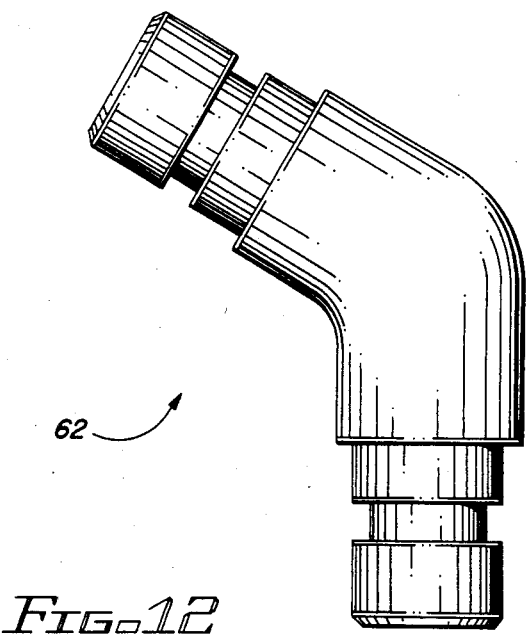
FIG. 12

SYSTEM AND METHOD FOR MECHANICALLY JOINING HANDRAILING MEMBERS

BACKGROUND OF THE INVENTION

This invention relates to a system and method for mechanically joining tubular members, and more particularly relates to a system and method for mechanically joining handrailing members.

In the past, railing members have been joined by riveting, brazing, or welding. However, these joint systems involve considerable expense in construction. Additionally, they distract from the appearance of the article.

Other railing systems use bolts or screws to connect railing members. However, these joint systems are not tamperproof. If one were to remove or loosen the bolts or screws, the railing system would become weak and ineffective. If a person were to lean against a handrailing system that was missing bolts or screws the system might collapse and cause the person to fall. A handrailing system in which the bolts or screws have been removed may be more dangerous than not having a handrailing system at all since people generally assume that a handrail can be leaned upon. One rail system manufactured by Reynolds Aluminum and known under its trademark name as Reyno Rail II is described in a 1974 brochure copyrighted by Reynolds Metal Company.

Prior patents pertaining to connecting systems include: U.S. Pat. No. 3,122,383 to Hirsch; U.S. Pat. No. 3,336,004 to Edie et al; U.S. Pat. No. 3,544,140 to Langheck; U.S. Pat. No. 4,063,836 to Millitano; U.S. Pat. No. 4,140,298 to Coleman; U.S. Pat. No. 4,247,147 to Rettkowski; U.S. Pat. No. 4,361,314 to Ohlson; and U.S. Pat. No. 4,405,251 to Kolchinsky et al.

SUMMARY OF THE INVENTION

An object of the present invention is to provide an improved system for interconnecting railing members.

A further object of the present invention is to provide a system for interconnecting railing members which is tamper proof.

A further object of the present invention is to provide a system for interconnecting railing members in which the connections are strong.

A still further object of the present invention is to provide a system for interconnecting railing members in which the connections can be made quickly and easily.

The present invention contemplates a system for interconnecting railing members, in which one railing member has a male end which fits inside a female end of an adjacent railing member, with an annular collar for preventing longitudinal movement of the male member relative to the female member where the annular collar is in an annular void formed by a groove in both the male and female members.

In a preferred embodiment the leading edge of the male member is beveled and the inside edge of the annular collar is beveled so that the cross-sectional diameter of the male member is slightly smaller than the inside diameter of the annular collar at the edge of the annular collar facing the male member. Thus, when the annular collar is pushed against the male member, the annular collar will expand and pass over the male member until the annular collar reaches the groove in the male member. Once the annular collar reaches the groove in the male member, the collar will relax and be constrained by the walls of the groove in the male member.

In the preferred embodiment, the outside edge of the annular collar is beveled so that the outside diameter of the edge of the annular collar facing the female member is slightly smaller than the cross-sectional diameter of the shaft of the male member, yet the outside diameter of the edge of the annular collar which faces the male member is larger than the inside cross-sectional diameter of the female member. Thus, when the female member passes over the male member and pushes against the annular collar, the annular collar will contract inside the groove of the male member until the groove in the female member aligns with the annular collar. Once the groove in the female member aligns with the annular collar, the annular collar will snap back into a relaxed position. Since, in the relaxed position the outside diameter of the edge of the annular collar which faces the male member is larger than the inside cross-sectional diameter of the female member, the female member is constrained from moving longitudinally relative to the male member.

Further in the preferred embodiment, the system prevents axial rotation of the female member relative to the male member by an anti-rotational protrusion on the male member and a longitudinal groove within the inside surface of the female member for receiving the anti-rotational protrusion.

BRIEF DESCRIPTION OF THE DRAWINGS

The foregoing and other objects, features and advantages of the invention will become more apparent by reference to the following detailed description, taken in conjunction with the accompanying drawing in which:

FIG. 1 is a perspective view of two railing members joined together;

FIG. 2 is a perspective exploded view of the same joint system;

FIG. 3 is a fragmentary longitudinal section view of the male member and the annular collar before it is placed over the male member;

FIG. 4 is a fragmentary longitudinal section view of the expanded annular collar as it passes over the male member;

FIG. 5 is a fragmentary longitudinal section view of the relaxed annular collar within the groove of the male member;

FIG. 6 is a fragmentary longitudinal section view of the annular collar being compressed by the female member;

FIG. 7 is a fragmentary longitudinal section view of the connected joint;

FIG. 8 is a plan view of a female member with a tooling port;

FIG. 9 is a section view of FIG. 8.

FIG. 10 is a plan view of a joining member in the form of a 90°-elbow;

FIG. 11 is a plan view of a joining member in the form of a 45°-elbow;

FIG. 12 is a plan view of a joining member in the form of a 135°-elbow;

DESCRIPTION OF THE PREFERRED EMBODIMENT

Figure 13:
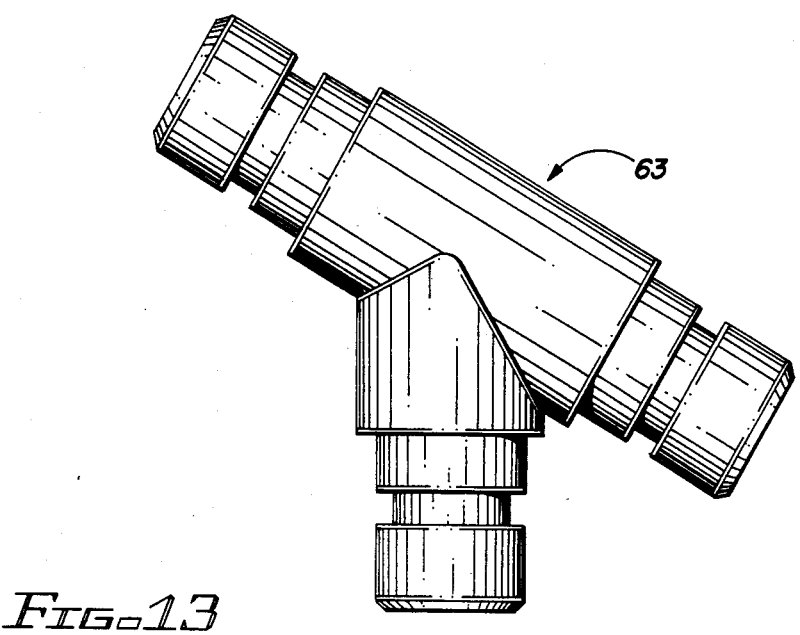
FIG. 13 is a plan view of a joining member in the form of a bent-T.

A detailed description of the preferred embodiment will now be described with reference to FIGS. 1 and 2.

The mechanical joint of the present invention has a first railing member 20 having a male end defined by a male protrusion 26 of reduced diameter with respect to the first railing member 20 and an adjacent second railing member 30 having a female end defined by a longitudinal hole 36 in the second railing member 30 with the hole 36 shaped and dimensional to receive the male protrusion 26 of the first railing member 26. The second railing member 30 has a circumferential groove 32, extending outwardly from the periphery of the hole 36, which is positioned over an inwardly extending circumferential groove 22, along the male protrusion 26 when the protrusion 26 is extended fully into the hole 36 of the second railing member 30. A C-shaped annular collar 40, having an inside diameter less than the diameter of the male protrusion 26 and an outside diameter greater than the inside diameter of the hole 36 in the second rail member 30, is positioned within the two grooves 22 and 32 to prevent the longitudinal movement of the first railing member 20 relative to the second railing member 30.

Referring now to FIG. 3, it is shown that the annular collar 40 has an inwardly extending beveled surface 42 about one of its sides and an outwardly extending beveled surface 46 about its opposite side. The male protrusion 26 has an outwardly extending beveled surface 24 at its outer extremity so that the diameter of the male protrusion 26 at its outer extremity is less than the inside diameter of the annular collar 40 at the inwardly extending beveled surface 46 of the annular collar 40. Reference is now made to FIGS. 4 and 5, which show that the annular collar 40 is expanded outwardly by movement of its inwardly beveled surface 42 across the outwardly beveled surface 24 of the male protrusion 26 then over the male protrusion 26 and into the groove 22 of the male protrusion 26.

The outside diameter of the annular collar 40 at its side having the outwardly extending beveled surface 46 is slightly smaller than the diameter of the male protrusion 26 when the collar 40 is in a non-stressed condition. The outside diameter of the annular collar 40 at the edge 47 which faces the first rail member 20 is larger than the diameter of the hole 36 of the second railing member 30. As shown in FIGS. 6 and 7, when the female end of the second railing member 30 passes over the male protrusion 26 and pushes against the annular collar 40, the annular collar 40 contracts inside the groove 22 of the male protrusion 26 until the groove 32 of the second railing member 30 aligns with the annular collar 40. When the groove 32 of the female end 36 aligns with the annular collar 40, the annular collar 40 will snap back into a non-stressed position within the two grooves 22 and 32. Since the outside diameter of the annular collar 40 at the edge 47 is larger than the diameter of hole 36 of the second rail member 30, the second rail member 30 is constrained from moving longitudinally away from the first rail member 20.

Preferably, when the two grooves 22 and 32 align, the edge 23 of the first rail member 20 at the base of the male protrusion 26 abuts the leading edge 23 of the second rail member 30 thus constraining longitudinal movement of the second rail member 30 toward the first rail member 20.

Referring again to FIG. 1, it is shown that there is an anti-rotational protrusion 27 on the male protrusion 26 and a longitudinal groove 37 extending outwardly from the periphery of the hole 36 within the second rail member 30 for receiving the anti-rotational protrusion 27. The anti-rotational protrusion 27 within the longitudinal groove 37 prevents axial rotation of the second rail member 30 relative to the first rail member 20.

Further in accordance with the preferred embodiment of the present system, both ends of all longitudinal members such as member 30 of FIGS. 1 and 2 are female ends and both ends of joining members have male protrusions such as member 20. Additionally, it is preferred that all railing members be cylindrical, although other shapes are suitable.

In another embodiment of the present invention, the connection can be altered so that the rail members are removable. In particular, FIGS. 8 and 9 show external tooling ports 39 in the female end of the second rail member 30 extending radially inward which communicates with the internal groove 32. This provides access to the annular collar 40 so that the annular collar 40 can be compressed with an appropriate tool, thus enabling the second rail member 30 to slide over the annular collar 40.

Figure 14:
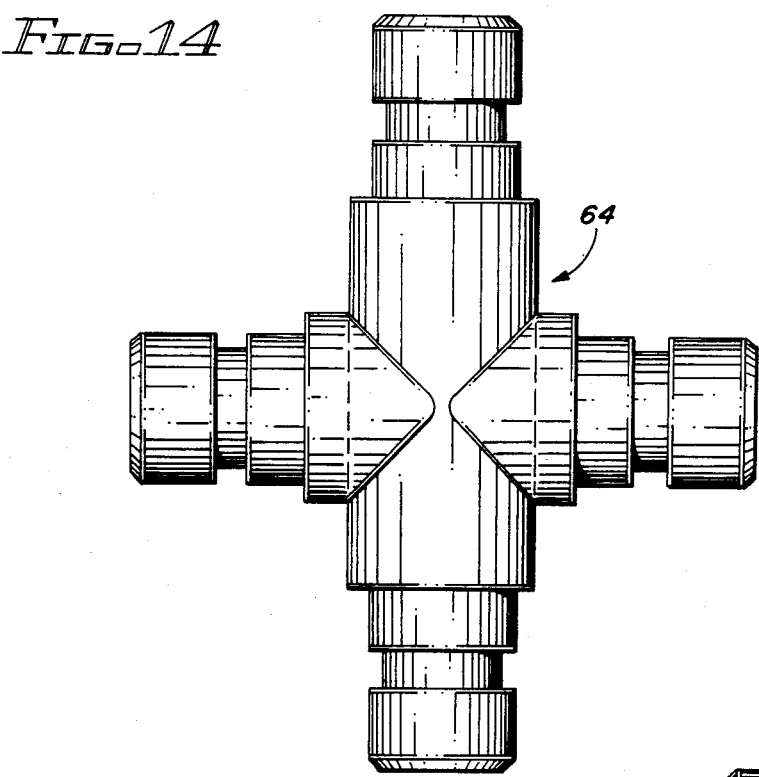
FIG. 14 is a plan view of a joining member in the form of a cross.

Examples of various geometrical configurations of the male member of the present invention are shown in FIGS. 10–14. FIG. 10 shows a joining member 60 in the form of a 90 degree elbow with a male protrusion at both ends. FIG. 11 shows a joining member 61 in the form of a 45 degree elbow with a male protrusion at both ends. FIG. 12 shows a joining member 62 in the form of a 135 degree elbow with a male protrusion at both ends. FIG. 13 shows a joining member 63 in a bent-T configuration with a male protrusion at each of the three ends. FIG. 14 shows a joining member 64 in the form of a cross with a male protrusion at each of the four ends.

Figure 15:
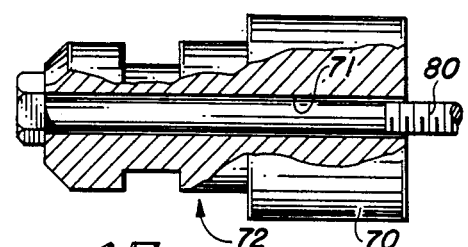
FIG. 15 is a plan view of a joining member with a longitudinal bore and a bolt through it.

Another embodiment of the present invention is shown in FIG. 15. Here, a joining member 70 with a male protrusion 72 has a through longitudinal bore 71 for receiving a bolt 80 which is longer than the joining member 70. This configuration permits the male member to be bolted onto a permanent fixture such as a floor or building. When a longitudinal member with a female end is placed over the male member 70 the bolt is hidden and the system remains tamperproof.

While the principles of the invention have now been made clear in an illustrative embodiment, there will become obvious to those skilled in the art many modifications in structure, geometrical configurations, arrangements, portions, materials and components used in the practice of the invention and otherwise which are particularly adapted for specific environments and operating requirements without departing from those principles. The appended claims are therefore intended to cover and embrace any such modifications, within the limits only of the true spirit and scope of the invention.

I claim:

1. A mechanical joint structure for interconnecting rail members comprising:
   (a) a first rail member with a male protrusion having an external circumferential groove on said male protrusion;
   (b) a second rail member with a female end defined by a longitudinal hole shaped and dimensioned to receive said male protrusion and having an internal circumferential groove which aligns with said external groove of said male protrusion when said male protrusion is mated with said female end;

(c) an annular collar dimensioned to fit inside an annular void formed by said groove of said male protrusion and said groove of said female end, to prevent longitudinal movement of said first rail member relative to said second rail member;

(d) means including a beveled camming surface at the extremity of said protrusion for expanding said annular collar as said annular collar passes over said male protrusion into said external groove of said male protrusion into said external groove of said male protrusion; and (e) means including an outer camming surface on said annular collar for contracting said annular collar within said external groove of said male protrusion as said female end passes over said annular collar until said annular collar is received by the internal groove of said female end.

2. A mechanical joint structure according to claim 1, wherein said means for expanding said annular collar until it is received by the external groove of said male protrusion further comprises:

(a) a beveled surface on the internal surface of said annular collar wherein said internal surface of said annular collar is beveled at the edge which faces said first rail member.

3. A mechanical joint structure according to claim 2 wherein the means for contracting said annular collar until said annular collar is received by said internal groove of said female end comprises said outer camming surface on the external edge of said annular collar which faces said female end and wherein the outside dimensions of said annular collar along said external edge is slightly smaller than the cross-sectional dimensions of said male protrusion.

4. A mechanical joint structure according to claim 3 comprising:

(a) an anti-rotational element on said male protrusion;
(b) a longitudinal groove on the inside surface of said female end for receiving said anti-rotational element.

5. A mechanical joint structure according to claim 3 comprising external tooling ports in said female end extending radially inward at said internal groove.

6. A mechanical joint structure according to claim 3 wherein the rail members with female ends are cylindrical tubes and the rail members with male ends are joining members for connecting said cylindrical tubes.

7. A mechanical joint structure according to claim 3 wherein said first rail member has a longitudinal cylindrical bore through its approximate axial center, further comprising:

(a) a cylindrical bolt, which is longer than said first rail member, dimensioned to fit through said bore, having a leading end and a trailing end with a head on said trailing end;
(b) means for placing said bolt through said cylindrical bore so that said head of said bolt abuts the leading end of said male member and said leading end of said bolt protrudes out the other end of said male member; and
(c) means for attaching said leading end of said bolt to a permanent fixture.

8. A mechanical joint structure according to claim 3 wherein said second rail member mounts flush with said first rail member to provide a smooth outer surface.

9. A mechanical interconnecting system for railings and the like, comprising:

(a) a first railing member having at least one male end defined by a male protrusion of reduced diameter with respect to said first railing member, said protrusion having a circumferential groove along said protrusion and with an outwardly extending beveled surface at the outer extremity of said protrusion;

(b) a second railing member having at least one female end defined by a longitudinal hole in said railing member, said hole having a shape and dimension so as to receive said male protrusion of said first railing member, said second railing member further including a circumferential groove extending outwardly from the periphery of said hole, said groove being spaced from the extremity of said female end a dimension which causes said groove to be positioned over said groove in said first railing member when said protrusion is extended fully into said hole of said second railing member;

(c) a locking collar defined by a flat ring of a high tensile strength metal having a discontinuity along said ring, the outer diameter of said locking collar in a nonstressed condition being greater than the outer diameter of said protrusion, said locking collar including an inwardly extending beveled surface about one side thereof, and an outwardly extending beveled surface about the opposite side; and wherein;

(d) said locking collar is expanded outwardly by movement of said inwardly beveled surface across said outwardly beveled surface of said protrusion then over said protrusion and into said groove of said first railing member, said outwardly beveled surface of said locking collar permitting the forward extremity of said second railing member to cam said locking collar into said groove of said first railing member.

10. A mechanical interconnecting system according to claim 9 further comprising:

(a) an anti-rotational element on said male protrusion; and
(b) a longitudinal groove extending outwardly from the periphery of the hole within the second member for receiving said anti-rotational element.

11. A mechanical joint structure according to claim 9 comprising external tooling ports in said female end extending radially inward at said circumferential groove.

12. A method for interconnecting hand rail members, comprising the steps of:

(a) providing a first rail member with a male protrusion having an external circumferential groove on said male protrusion;
(b) providing a second rail member with a female end, the inside cross-sectional diameter of which is slightly larger than the outside diameter of said male protrusion, and having an internal circumferential groove;
(c) providing an annular collar;
(d) providing beveled camming surfaces with said first and second rail members and said collar;
(e) simultaneously pushing said protrusion into said female end and camming said collar over the extremity of said protrusion, and then sliding said annular collar over said male protrusion into said external groove of said male protrusion;

(f) thereafter compressing said annular collar by camming said annular collar into said external groove of said male protrusion; and (g) sliding said female end over said male protrusion and said compressed annular collar in order to align said internal circumferential groove of said female end with said annular collar.

13. A method for interconnecting hand rail member according to claim 12, further comprising the steps of:

(a) providing a longitudinal cylindrical bore through the axial center of said first rail member;

(b) providing a cylindrical bolt, which is longer than said first rail member, said bolt having a diameter which is slightly smaller than the diameter of said cylindrical bore, said bolt having a leading end and a trailing end with a head on said trailing head;

(c) placing said bolt through said cylindrical bore so that said head of said bolt abuts the leading end of said male protrusion and said leading end of said bolt protrudes out the other end of said first rail member; and (d) attaching said leading end of said bolt to a permanent fixture.

* * * * *